J. C. GASTON.
Hand-Seeder.
No. 10,608
Patented Mar. 7, 1854.
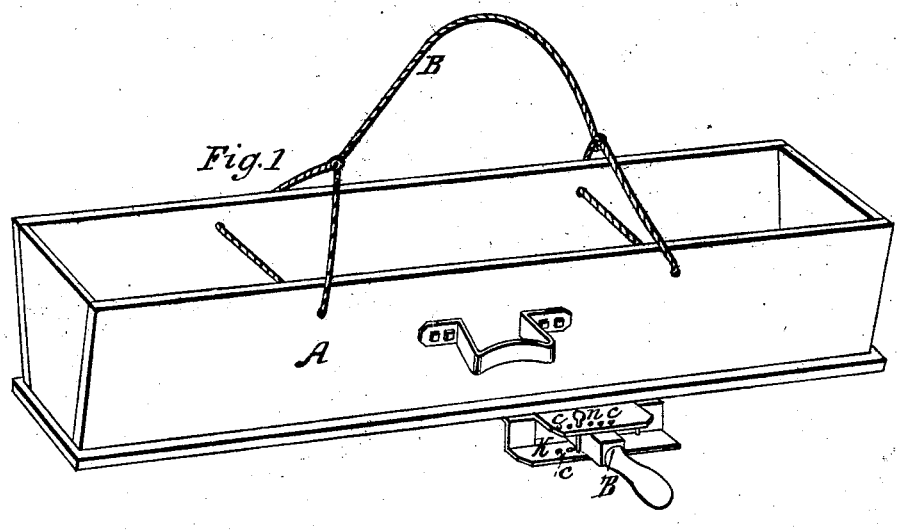
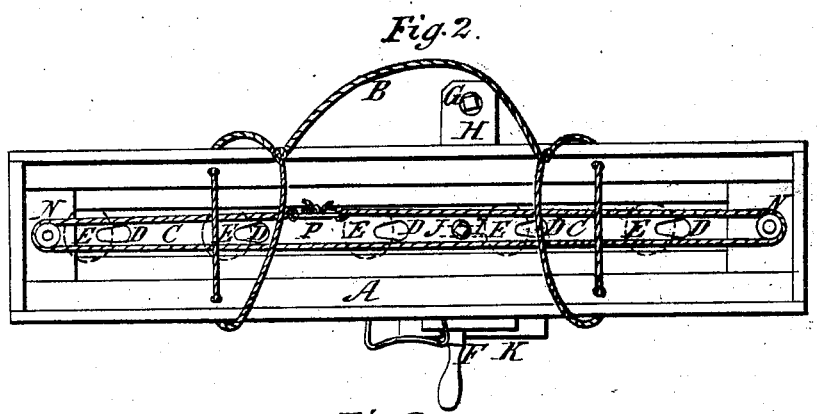
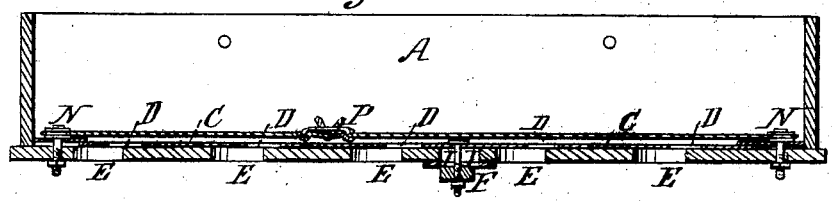

UNITED STATES PATENT OFFICE.

JEREMIAH C. GASTON, OF READING, OHIO.

IMPROVEMENT IN SEED-PLANTERS.

Specification forming part of Letters Patent No. 10,608, dated March 7, 1854.

*To all whom it may concern:*

Be it known that I, JEREMIAH C. GASTON, of Reading, in the county of Hamilton and State of Ohio, have invented a new and useful Improvement in Hoppers for Sowing Seeds Broadcast, of which the following is a full, clear, and exact description, reference being had to the accompanying drawings, which form part of this specification, and in which—

Figure 1 represents a view in perspective of my improved seed-distributer; Fig. 2, a top view of the same, and Fig. 3 a central longitudinal section.

My improvement consists in the peculiar construction and operation of a reciprocating agitator in the hopper, for the purpose of preventing the clogging of the seed and to insure its discharge.

In the accompanying drawings, A represents a hopper for carrying the seed to be sown. It resembles in its general form and proportions a long narrow trough, furnished with a strap, B, which is passed over the shoulders of the carrier to suspend the hopper in front of him. This hopper may be either carried on foot or on horseback.

In the bottom of the hopper a slide, C, is fitted, which is free to move back and forth lengthwise. It is perforated with oblong tapering openings D, whose small ends point in the same direction.

The bottom of the hopper has a series of openings, E, corresponding to those in the slide; and these openings D and E are so situated that when the slide C is moved in one direction they will communicate and form the passages for the seed from the hopper, and when it is moved in the other their communication will be shut off. The openings D are of a length equal to the maximum stroke of the slide, and their sides diverge outwardly from their small ends, so that as they communicate with the openings E they will gradually increase in width in a ratio proportioned to the movement of the slide.

The reciprocating motion of the slide is effected by means of a lever, F, having its fulcrum G in a bracket, H, projecting from the outside of the hopper. This lever is situated transversely beneath the hopper, and is connected to the slide by a pin, I, passing through a slot, J, in the bottom of the hopper to allow it to move the slide. The inner end of this lever projects through a gage-plate, K, attached to the side of the hopper next to the carrier, and forms the handle by which the slide is operated. This plate K is perforated with a series of holes, c, into which a pin, n, is inserted to limit the movement of the lever, and thus determine the stroke of the slide.

In the bottom of the hopper I arrange an agitator by passing an endless cord or chain around a sheave, N, at each end of the hopper and attaching it to a loop, P, that projects from the slide C, and from which it derives its motion. In the event of using the cord to form the agitator it may be either knotted or othwise, according to the kind of seed to be sown and the degree of agitatation required to prevent the clogging of the discharge-openings and to insure the free and equal dissemination of the seed; and as the cord is attached to the slide and derives its motion therefrom, and the motion of the one is simultaneous with and equal to that of the other, it follows that the discharge and agitation of the seed will always be proportioned to the rapidity and range of motion of the slide. The motion of the cord of the agitator on one side of the pulleys will be in the contrary direction to that on the other, and thus greatly counteract the tendency of the seed to follow the motion of the slide.

It is obvious that this agitator may be variously modified and applied to machines of different construction without departing from the principle of my invention.

What I claim as my invention, and desire to secure by Letters Patent, is—

The reciprocating agitator constructed and operating in the manner and for the purposes herein set forth.

In testimony whereof I have hereunto subscribed my name.

JEREMIAH C. GASTON.

Witnesses:
JAMES CLARK,
THEOPHILUS MYERS.